3,132,924
PLUTONIUM COMPOUNDS
Lewis Eric Russell, Oxford, England, assignor to United Kingdom Atomic Energy Authority, London, England
No Drawing. Filed Aug. 19, 1960, Ser. No. 50,590
Claims priority, application Great Britain Sept. 1, 1959
7 Claims. (Cl. 23—14.5)

The invention relates to new compounds of plutonium and nuclear fuel materials comprising these compounds.

According to the invention, the new compounds have the formula $MPuO_3$ or $PuMO_3$, where M is a metal, and have the perovskite structure.

According to one form of the invention, a new compound is provided which consists of barium plutonate which has the formula $BaPuO_3$ and has the perovskite structure.

According to another form of the invention, new compounds are provided which consist of plutonium aluminate, vanadate, chromate and manganate, which have the formula $PuMO_3$ where M is Al, V, Cr or Mn, and which have the perovskite structure.

Compounds having the perovskite structure have the formula $ABO_3$ where A and B are metals, and either A is a metal in the divalent state and B is a metal in the quadrivalent state, or A and B are metals both in the trivalent state. The perovskite structure is either of cubic symmetry, or slightly-distorted cubic, e.g. rhombohedral or orthorhombic, and can be regarded as a network of $BO_6$ octahedra linked to each other through oxygen atoms at the corners of each octahedron, with ions of A in the interstices between the octahedra and in 12-fold co-ordination with the oxygen atoms surrounding them.

The nature of the metal B is further limited by geometrical considerations. The ratio of the ionic radius of B to that of oxygen, in the perovskite structure, is restricted to the limits 0.41 to 0.73. The ionic radius of oxygen in compounds having the perovskite structure is estimated to lie between about 1.34 and 1.40 Angstrom units. The limits of the ionic radius of B are therefore about 0.55 to 1.02 Angstrom units.

The nature of A is also limited by geometrical considerations. The ratio of the sum of the ionic radii of A and oxygen to the sum of the ionic radii of B and oxygen, in the perovskite structure, is restricted to the limits 1.13 to 1.41.

The ionic radii assumed by plutonium ions in a perovskite structure cannot be predicted accurately, but that of the trivalent plutonium ion would certainly be greater than 1.02 Angstrom units, while that of the quadrivalent plutonium ion would certainly lie within the limits of 0.55 to 1.02 Angstrom units.

There are therefore two hypothetical types of plutonium compound which might have the perovskite structure: those having the formula $MPuO_3$, where M is a divalent metal and Pu is quadrivalent, and $PuMO_3$ where M is a trivalent metal and Pu is trivalent. In the former case, the ionic radius of M would have to fall within the limits $1.41 R_1 + 0.41 R_0$ to $1.13 R_1 + 0.13 R_0$ where $R_1$ is the ionic radius of the quadrivalent plutonium ion and $R_0$ is the ionic radius of the oxygen ion, in the perovskite structure formed. In the latter case, the ionic radius of M would have to fall within the limits $0.41 R_0$ and $0.73 R_0$. In both cases $R_0$ might have a value between 1.34 and 1.40 Angstrom units. Therefore, in the former ($MPuO_3$) the ionic radius of M might have any value between $1.41 R_1 + 0.58$ and $1.13 R_1 + 0.18$ while in the latter it might have any value between 0.55 and 1.02.

Because of the uncertainty in the ionic radii to be assigned to plutonium, the metal M and oxygen in a hypothetical compound with a perovskite structure, it is not possible to predict, from the very wide range of possible metals M, which will actually lead to the formation of a compound with plutonium having a perovskite structure. It is our discovery, that out of this wide range of metals M only barium, aluminium, vanadium, chromium and manganese lead to such a compound being formed.

The thermal neutron absorption cross-section of these metals is given in the following table:

|  | Barns |
|---|---|
| Barium | 1.2 |
| Aluminum | 0.23 |
| Vanadium | 4.9 |
| Chromium | 3.1 |
| Manganese | 13.3 |

With the exception of manganese, all these metals have a sufficiently low absorption cross-section to enable them to be incorporated in a nuclear reactor.

According to a further aspect of the invention, therefore, a nuclear fuel material comprises a compound of plutonium selected from the group consisting of barium plutonate, plutonium aluminate, plutonium vanadate and plutonium chromate, having the formulae $BaPuO_3$, $PuAlO_3$, $PuVO_3$ and $PuCrO_3$, respectively, and having the perovskite structure.

Each of these compounds can be readily prepared at temperatures of 1300° to 1650° C., have high melting points, probably in excess of 1500° C., and are stable in oxidising atmospheres at high temperatures. In common with other compounds having the perovskite structure they have ferroelectric properties, i.e. have a very high dielectric capacity and high electrical and thermal conductivities compared with other ceramic materials.

The nature of the invention will be made more apparent by the following examples:

Example I

Plutonium dioxide powder was mixed intimately with barium carbonate powder in the stoichiometric amount to form $BaPuO_3$, and then heated in an alumina container in air to 1500° C. for 1 hour. The product consisted of $BaPuO_3$, together with excess $PuO_2$, due to volatilisation of barium or its compounds. The perovskite structure of the $BaPuO_3$ was established by X-ray diffraction.

Example II

Plutonium dioxide powder was mixed intimately with barium carbonate powder, the latter being an amount 10% above the stoichiometric amount to form $BaPuO_3$. The mixture was compacted into small pellets and then heated in a thoria container in air to 1650° C. for 3 hours. The product still contained some $PuO_2$, but mainly consisted of $BaPuO_3$, the perovskite structure of which was established by X-ray diffraction.

Example III

Plutonium dioxide powder was mixed intimately with aluminium hydroxide powder, the latter being in amount 10% above the stoichiometric amount to form $PuAlO_3$. The mixture was compacted into small pellets and then heated for 2 hours at 1500° C. in a thoria container in hydrogen to effect reduction of the plutonium to the trivalent state. The product consisted mainly of $PuAlO_3$, the perovskite structure of which was established by X-ray diffraction.

Example IV

Plutonium dioxide powder was mixed intimately with vanadium pentoxide powder in the stoichiometric amount to form $PuVO_3$. The mixture was compacted into small pellets and then heated for 2 hours at 1500° C. in a thoria container in hydrogen to effect reduction of the plutonium and vanadium to their trivalent states. The product consisted entirely of PuVO$_3$, the perovskite structure of which was established by X-ray diffraction. The product had an electrical conductivity of about 37 ohm-cm. and was stable up to at least 1500° C.

*Example V*

Plutonium dioxide powder was mixed intimately with chromium trioxide powder in the stoichiometric amount to form PuCrO$_3$. The mixture was compacted into small pellets and then heated for 2 hours at 1500° C. in a thoria container in hydrogen to effect reduction of the plutonium and chromium to their trivalent states. The product consisted entirely of PuCrO$_3$, the perovskite structure of which was established by X-ray diffraction.

*Example VI*

Plutonium dioxide powder was heated in hydrogen to reduce about 50% of the plutonium to the trivalent state. The resultant mixture of PuO$_2$ and Pu$_2$O$_3$ was mixed intimately with chromium trioxide in the stoichiometric amount to form PuCrO$_3$ compacted into small pellets and then heated for 2 hours at 1300° C. in a thoria container in hydrogen to reduce the chromium and the remainder of the plutonium to their trivalent states. The product consisted of PuCrO$_3$ together with some unreduced PuO$_2$. The perovskite structure of the PuCrO$_3$ was established by X-ray diffraction.

*Example VII*

Plutonium dioxide powder was mixed intimately with manganous carbonate powder in the stoichiometric amount to form PuMnO$_3$, and then heated for 2 hours at 1500° C. in an alumina container in hydrogen. Under these conditions a complex composition containing PuMnO$_3$ was obtained, the perovskite structure of the PuMnO$_3$ being shown by X-ray diffraction.

In general, methods of preparing the compounds of this invention consisting in simple heating of an oxide of plutonium with an oxide, or oxide-yielding compound, of the metal M, under conditions conducive to production of the plutonium in the desired valency state. Thus BaPuO$_3$, in which the plutonium is in the quadrivalent state, is produced by heating under oxidising conditions, e.g. in air, while the compounds of formula PuMO$_3$ are produced by heating under reducing conditions, e.g. in hydrogen or in the presence of carbon. The compound of the metal M (including Ba) may be an oxide of the metal, or an oxide-yielding compound, such as a hydroxide, carbonate or oxalate of the metal.

Other metals which might have led to the formation of perovskite compounds with plutonium were investigated, but did not lead to such compounds. These other metals included boron, iron, and gallium, which might have formed compounds of the formula PuMO$_3$ with the perovskite structure; and beryllium, magnesium, calcium, strontimum, lead and cadmium, which might have formed compounds of the formula MPuO$_3$ with the perovskite structure. None of these led to the formation of compounds with the perovskite structure.

I claim:

1. A new compound of plutonium selected from the group consisting of barium plutonate having the formula BaPuO$_3$ wherein the valance of Pu is 4, plutonium aluminate having the formula PuAlO$_3$ wherein the valance of Pu is 3, plutonium vanadate having the formula PuVO$_3$ wherein the valance of Pu is 3, plutonium chromate having the formula PuCrO$_3$ wherein the valance of Pu is 3, and plutonium manganate having the formula PuMnO$_3$ wherein the valance of Pu is 3, each of said compounds having the perovskite structure.

2. Barium plutonate having the formula BaPuO$_3$ wherein the valance of Pu is 4, said barium plutonate having the perovskite structure.

3. Plutonium aluminate having the formula PuAlO$_3$ wherein the valance of Pu is 3, said plutonium aluminate having the perovskite structure.

4. Plutonium vanadate having the formula PuVO$_3$ wherein the valance of Pu is 3, said plutonium vanadate having the perovskite structure.

5. Plutonium chromate having the formula PuCrO$_3$ wherein the valance of Pu is 3, said plutonium chromate having the perovskite structure.

6. Plutonium manganate having the formula PuMnO$_3$ wherein the valance of Pu is 3, said plutonium chromate having the perovskite structure.

7. A nuclear fuel material comprising a compound of plutonium selected from the group consisting of barium plutonate having the formula BaPuO$_3$ wherein the valance of Pu is 4, plutonium aluminate having the formula PuAlO$_3$ wherein the valance of Pu is 3, plutonium vanadate having the formula PuVO$_3$ wherein the valance of Pu is 3, plutonium chromate having the formula PuCrO$_3$ wherein the valance of Pu is 3, and plutonium manganate having the formula PuMnO$_3$ wherein the valance of Pu is 3, each of said compounds having the perovskite structure.

References Cited in the file of this patent

UNITED STATES PATENTS

| | | |
|---|---|---|
| 2,843,343 | Connick | July 15, 1958 |
| 2,931,701 | Faris | Apr. 5, 1960 |

OTHER REFERENCES

"Nuclear Science Abstracts," vol. 14, Item 18710, Oct. 15, 1960, which cites AEC report HW–65078 of May 10, 1960.